US007009944B1

(12) United States Patent
Hulbert

(10) Patent No.: US 7,009,944 B1
(45) Date of Patent: Mar. 7, 2006

(54) METHOD OF AND APPARATUS FOR POWER CONTROL

(75) Inventor: Anthony Peter Hulbert, Southampton (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 09/830,408

(22) PCT Filed: Oct. 27, 1999

(86) PCT No.: PCT/GB99/03496

§ 371 (c)(1),
(2), (4) Date: Jul. 12, 2001

(87) PCT Pub. No.: WO00/25444

PCT Pub. Date: May 4, 2000

(30) Foreign Application Priority Data

Oct. 27, 1998 (GB) .................................. 9823396

(51) Int. Cl.
*H04B 7/005* (2006.01)

(52) U.S. Cl. .................. 370/278; 370/252; 370/336

(58) Field of Classification Search ............. 370/278, 370/294, 342, 336, 337, 347, 252, 441, 442, 370/480, 280; 455/422, 69; 375/220–222
See application file for complete search history.

(56) References Cited

U.S. PATENT DOCUMENTS

| 5,305,468 A | 4/1994 | Bruckert ................. 455/69 |
| 5,790,940 A * | 8/1998 | Laborde et al. ........... 455/69 |
| 6,418,137 B1 * | 7/2002 | Bontu et al. ............. 370/347 |
| 2002/0172223 A1 * | 11/2002 | Stilp ....................... 370/480 |

FOREIGN PATENT DOCUMENTS

| EP | 0 810 743 A | 12/1997 |
| WO | WO 97 17769 A | 5/1997 |

* cited by examiner

*Primary Examiner*—John Pezzlo
(74) *Attorney, Agent, or Firm*—Crowell & Moring LLP

(57) ABSTRACT

When transmitting bursty data, for example packet data, a mobile terminal uses information relating to signal strength at the base station to determine the power at which the mobile terminal must transmit in order to produce a required signal to noise ratio at the base station. In frequency division duplex techniques, multi-path fading on the down-link is uncorrelated with multi-path fading on the up-link. Power measurements can be averaged at the mobile terminal over a likely fading period. However, this does not cater for instantaneous power level fluctuations in the up-link direction, which can result in the power transmitted by the mobile terminal being too high or too low at the start of a frame. The invention maintains a predetermined signal to noise ratio. At a given time slot, a power level is determined which, over remaining time slots, is based on the sum of power levels corresponding to previous time slots and the number of time slots remaining in the frame. Where multi-path fading occurs, smaller variations in average power over the frame will occur leading to improved system capacity.

10 Claims, 2 Drawing Sheets

METHOD OF AND APPARATUS FOR POWER CONTROL

The present invention relates to a method of and apparatus for power control, of the type used in a communication system, for example, in a spread-spectrum communication system, such as a Code Division Multiple Access (CDMA) communication system.

In a CDMA cellular communication system, power control is used to equalize signal to noise (S/N) ratios of the signals received at a base station from various mobile terminals. In the term 'signal to noise ratio', the term 'noise' is intended to include interference in the form of signals from other mobile terminals, as well as background noise.

A known technique involves measuring the S/N ratio in respect of signals received from a given mobile terminal over a measurement interval and comparing the measured S/N ratio against a desired threshold. If the measured S/N ratio exceeds the desired threshold, a binary 1 (or 0, depending upon the convention employed) is transmitted (within the plurality of signals transmitted from the base station) to the mobile terminal originating the given signal. If the measured S/N ratio is lower than the desired threshold, a binary 0 (or 1, depending upon the convention employed) is transmitted to the given mobile terminal. The mobile terminal, in turn, responds by reducing its transmission power by, for example, 1 dB if a 1 (or 0) is received or by increasing its power by 1 dB if a 0 (or 1) is received. In this way, the received S/N ratio is held approximately constant as path loss between the given mobile station and the base station varies and/or as the level of interference at the base station from other mobile terminals varies.

The above technique is effective in the transmission of continuous data where any transients associated with the initial setting of transmitter power at the mobile terminal can be ignored. However, where individual bursts (frames) of data are transmitted, for example packet data, the mobile terminal must set its initial transmitter power according to a so-called open loop power control technique. In this technique, the base station signals to the mobile terminal(s) the power at which the base station is transmitting; this can be either the total power received or the power of a particular signal which the mobile(s) station is receiving, and the interference level at the base station. The mobile terminal measures the power level of the corresponding signal received from the base station and uses the signalled information, i.e. the information relating to signal strength at the base station, to determine the power at which the mobile terminal must transmit in order to produce a required S/N ratio at the base station. On average, this should be the correct power. However, in many CDMA systems the frequency used for transmission from the base station to the mobile terminal (down-link) is different from the frequency used for transmission from the mobile terminal to the base station (up-link). Such a scheme is known as a Frequency Division Duplex (FDD) technique. In an FDD technique, propagation of signals is non-reciprocal in the short term, for example, multi-path fading on the down-link is uncorrelated with multi-path fading on the up-link. This effect can be mitigated somewhat by averaging the power measurements at the mobile terminal over the likely fading period. However, this does not cater for the instantaneous path level fluctuations in the up-link direction, resulting in the power transmitted by the mobile terminal being too high or too low at the start of the frame.

In a typical CDMA system, Forward Error Correction (FEC) with interleaving is employed in order to mitigate the effects of fading and interference from other signals operating on the same frequency. If a known soft decision decoding technique is employed, the effect of the interleaving is to make the probability of uncorrectable errors in an interleaved frame a function more of the average S/N ratio over the frame rather than, for example, the worst case S/N ratio. Consequently, if the S/N ratio at the start of a frame is too high, implementation of power control reduces the S/N ratio to the required threshold by the end of the frame, but the overall average will be higher than necessary. Conversely, if the S/N ratio at the start of a frame is too low, implementation of power control increases the S/N ratio to the required threshold by the end of the frame, but the overall average will be lower than necessary.

It is therefore an object of the present invention to obviate or at least mitigate the above described disadvantages.

According to the present invention, there is provided a method of power control in a communications system capable of transmitting a frame having a plurality of time intervals from a transmitter to a receiver, wherein power control is effected on the individual time intervals based upon information passed from the receiver to the transmitter, wherein the receiver seeks to maintain an average signal to noise ratio across the frame.

In accordance with a further aspect of the invention, there is provided a method according to claim 1, wherein the method comprises: i. for a first time interval of a frame, setting the initial transmission power level; and ii. for each subsequent time interval of the frame: measuring the received signal to noise ratio over subsequent time intervals; determining the cumulative SNR value over the received time interval of the frame; determining the number of time intervals remaining in the frame; and, adjusting the transmission power level in response to signalling from the receiver in respect of a further subsequent time interval based upon said cumulative SNR value and the number of time intervals remaining in the frame such that the required average signal to noise ratio is substantially achieved.

Thus, if the signal is received at a S/N ratio higher than necessary at the beginning of a frame, the method will ensure that the signal will be received at a level lower than the nominal S/N ratio by the end of the frame. Where multi-path fading occurs the use of this method will result in smaller variation in average power over the frame, leading to an improvement in system capacity.

In accordance with another aspect of the invention, there is provided a transmitter for a communication system operable to transmit in time frames having a plurality of time intervals, the transmitter comprising a power controller operable to: i. for a first time interval of a frame, set the initial transmission power level; and, ii. for each subsequent time interval of the frame: measure the received signal to noise ratio over subsequent time intervals; determine the cumulative SNR value over time received time interval of the frame; determine the number of time intervals remaining in the frame; and, adjust the transmission power level in response to signalling from the receiver in respect of a further subsequent time interval based upon said cumulative SNR value and the number of time intervals remaining in the frame such that the required average signal to noise ratio is substantially achieved.

This differs from known techniques which try to modify the power level within each time interval so as to substantially keep to the predetermined signal to noise ratio during each interval.

Preferably, the time interval is a time slot.

At least one embodiment of the invention will now be described by way of example, with reference to the accompanying drawings, in which.

Figure 1:
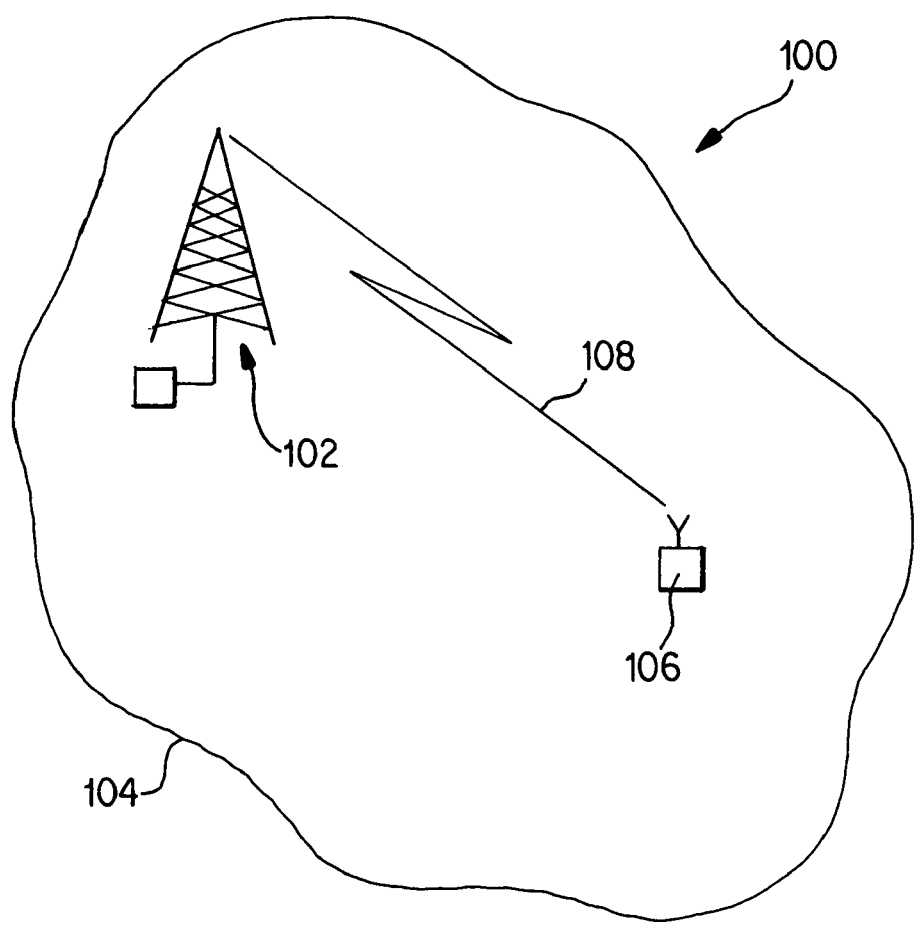
FIG. 1 is a schematic diagram of the entities used in a communications system.
Figure 2:
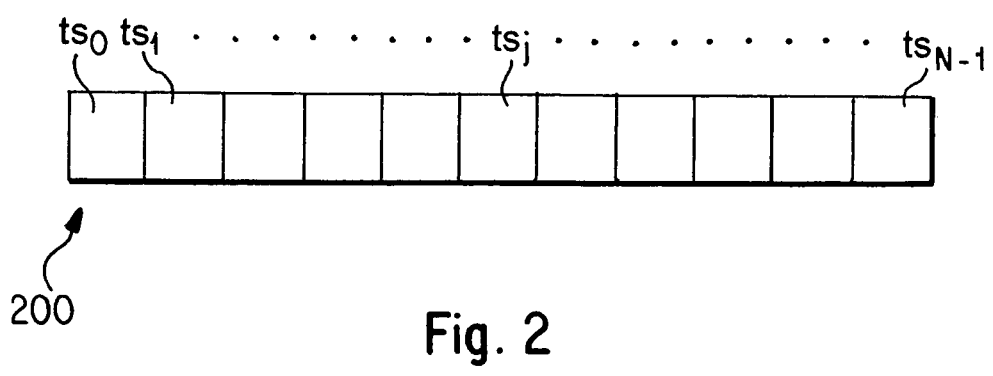
FIG. 2 is a schematic diagram of a frame used by the system of FIG. 1.

Referring to FIG. 1, a CDMA system comprises at least one base station 102 supporting a cell 104, the base station 102 being arranged to communicate with a mobile terminal 106 over a radio-frequency (RF) interface 108 by transmitting a frame 200 of data (FIG. 2). The frame 200 comprises N time slots $ts_0, \ldots, ts_{N-1}$.

In operation, the frame 200 is transmitted from the mobile terminal 106 to the base station 102, during which power control is achieved by N adjustments of power corresponding to N time slots in the frame 200.

Figure 3:
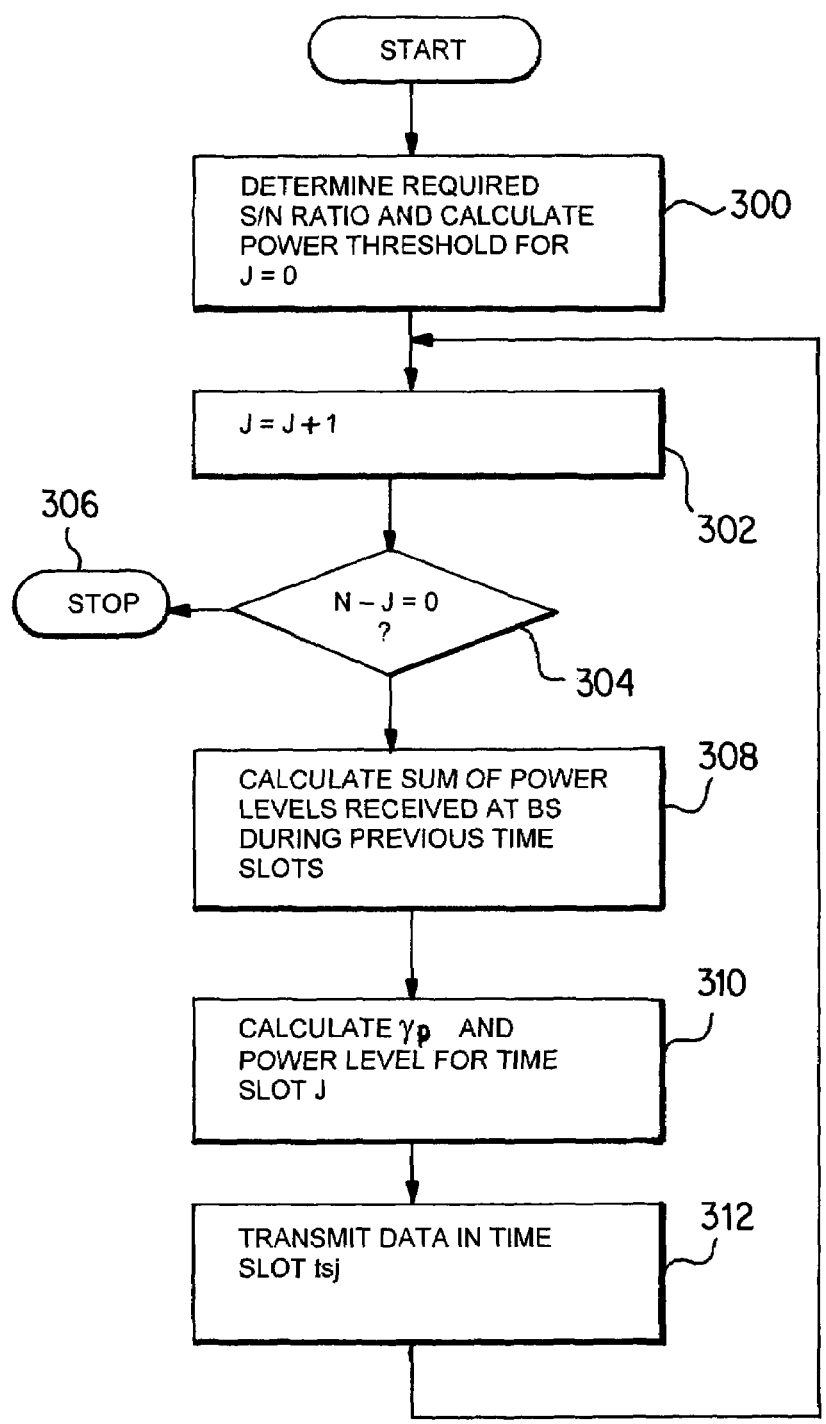
FIG. 3 is a flowchart of a method constituting an embodiment of the present invention.

Referring to FIG. 3, a required average S/N ratio $\gamma_d$ at the base station 102 over the duration of the frame 200 is initially determined and set (step 300). A power level is then set so that the average S/N ratio $\gamma_d$ per time slot at the base station 102 will be substantially met (step 300).

A subsequent time slot, $ts_j$, for which the power level is to be adjusted, is then selected (step 302) and the number of any remaining time slots, N−j, is determined (step 304). If the number of time slots remaining, N−j, is zero, no further power levels are set for the frame 200 (step 306). If, however, one or more time slots remain, the sum of respective measured power levels received at the base station 102 during previous time slots is calculated (step 308). The calculation can be generally expressed as:

$$\sum_{i=0}^{j-1} \gamma_i,$$

where $\gamma_i$ is the S/N ratio received in the ith slot.

Using the sum of the measured power levels, the predetermined average S/N ratio $\gamma_d$ and knowledge of the number of remaining time slots, a predicted S/N ratio, $\gamma_p$ is then calculated (step 310) and the value of $\gamma_p$ is used to calculate the power level at which the mobile terminal 106 transmits signals to the base station 102. The equation used to calculate the predicted S/N ratio $\gamma_p$ is derived as follows.

The predicted S/N ratio $\gamma_p$ is calculated based upon the assumption that a target, of the average S/N ratio, $\gamma_d$, across the frame 200, will be met if the calculated predicted S/N ratio $\gamma_p$ is maintained throughout the remainder of the frame 200, thereby keeping the average S/N ratio $\gamma_d$ substantially constant over the frame 200.

Since N−j power control intervals (time slots) remain in the frame 200 for which a power level is to be predicted, in order to satisfy the S/N ratio requirement of $N\gamma_d$ for the entire frame 200, the predicted S/N ratio $\gamma_p$ for the remaining intervals, $\gamma_p$ needs to satisfy the following equation:

$$\sum_{i=0}^{j-1} \gamma_i + (N-j)\gamma_p = N\gamma_d$$

Thus, the above equation is solved for $\gamma_p$ and hence the predicted required power level (and therefore the next threshold) is calculated using the following equation:

$$\gamma_p = \frac{N\gamma_d - \sum_{i=0}^{j-1} \gamma_i}{N-j}$$

During the selected time slot, $ts_j$, the mobile terminal 106 transmits at the power level set (step 312) corresponding to the associated predicted S/N ratio $\gamma_p$.

A subsequent time slot is then selected (step 302) and the above-described procedure for calculating and setting power levels is repeated (steps 304 to 312).

Minor obvious modifications can be made within the normal ability of a skilled person to take account of non zero periods for measurement and for signalling within the power control sub-system.

What is claimed is:

1. A method of power control in a communication system capable of transmitting, from a transmitter to a receiver, a frame having a plurality of time intervals, wherein power control is effected on the individual time intervals based upon information passed from the receiver to the transmitter, and the receiver seeks to maintain an average signal to noise ratio across the frame; said method comprising:

i. for a first time interval of a frame, setting an initial transmission power level; and ii. for each subsequent time interval of the frame, measuring a received signal to noise ratio over subsequent time intervals;

determining a cumulative signal to noise ratio value over a received time interval of the frame;

determining the number of time intervals remaining in the frame; and, adjusting the transmission power level in response to signalling from the receiver in respect of a further subsequent time interval, based upon said cumulative signal to noise ratio value and the number of time intervals remaining in the frame, such that a target average signal to noise ratio is substantially achieved.

2. The method according to claim 1, wherein the transmission power level for each subsequent time interval is set by:

calculating a predicted signal to noise ratio $\gamma_p$ using the sum of the measured power levels, the predetermined target average signal to noise ratio $\gamma_d$, and the number of remaining time intervals.

3. The method according to claim 1, wherein the predicted signal to noise ratio $\gamma_p$ is calculated based upon the assumption that the target average signal to noise ratio $\gamma_d$ across the frame, will be met if the calculated predicted signal to noise ratio $\gamma_p$ is maintained throughout the remainder of the frame, thereby keeping the average signal to noise ratio $\gamma_d$ substantially constant over the frame.

4. The method according to claim 1, wherein the time interval is a time slot.

5. The method according to claim 1, wherein the communication system is a spread spectrum communications system.

6. The method according to claim 5, wherein the spread spectrum communication system is a CDMA communications system.

7. The method according to claim 3, wherein the step of adjusting the power level achieves a signal to noise ratio, $\gamma_p$, which is given by the formula:

$$\gamma_p = \frac{N\gamma_d - \sum_{i=0}^{j-1} \gamma_i}{N-j}$$

wherein $\gamma_i$ is the signal to noise ratio received at the base station in the ith interval;

$$\sum_{i=0}^{j-1} \gamma_i,$$

is the sum of signal to noise ratios received corresponding to previous time intervals; and $N\gamma_d$ is desired total signal to noise ratio sum over the frame.

8. The method according to claim 5, wherein the duration of a frame corresponds to a burst comprising a plurality of consecutive CDMA frames.

9. The method according to claim 5, wherein the duration of a frame corresponds to the duration of a CDMA frame.

10. A transmitter for a communication system operable to transmit in time frames having a plurality of time intervals, the transmitter comprising a power controller operable to:

i. for a first time interval of a frame, set an initial transmission power level; and ii. for each subsequent time interval of the frame, measure a received signal to noise ratio over subsequent time intervals;

determine a cumulative signal to noise ratio value over a received time interval of the frame;

determine the number of time intervals remaining in the frame; and adjust the transmission power level in response to signalling from the receiver in respect of a further subsequent time interval, based upon said cumulative signal to noise ratio value and the number of time intervals remaining in the frame, such that a target average signal to noise ratio is substantially achieved.

* * * * *